(12) United States Patent
Allen et al.

(10) Patent No.: US 9,702,482 B1
(45) Date of Patent: Jul. 11, 2017

(54) TWO-PIECE U-SHAPED FAIRING

(71) Applicant: VIV Solutions LLC, Richmond, TX (US)

(72) Inventors: Donald Wayne Allen, Richmond, TX (US); Julie Ann Dehne, Cypress, TX (US); Jeffrey Robert Dupuis, Houston, TX (US)

(73) Assignee: VIV Solutions LLC, Richmond, TX (US)

( * ) Notice: Subject to any disclaimer, the term of this patent is extended or adjusted under 35 U.S.C. 154(b) by 0 days.

(21) Appl. No.: 15/190,604

(22) Filed: Jun. 23, 2016

Related U.S. Application Data

(60) Provisional application No. 62/183,299, filed on Jun. 23, 2015, provisional application No. 62/295,482, filed on Feb. 15, 2016.

(51) Int. Cl.
*F16L 1/20* (2006.01)
*B63B 21/66* (2006.01)
*F16L 1/12* (2006.01)
*E21B 17/01* (2006.01)
*F15D 1/10* (2006.01)
(Continued)

(52) U.S. Cl.
CPC .............. *F16L 1/123* (2013.01); *B21D 22/02* (2013.01); *E21B 17/01* (2013.01); *F15D 1/10* (2013.01); *B63B 21/663* (2013.01); *B63B 2021/504* (2013.01); *B63B 2021/666* (2013.01)

(58) Field of Classification Search
CPC .. B63B 2021/504; B63B 21/663; F16L 1/123; F16D 1/10
See application file for complete search history.

(56) References Cited

U.S. PATENT DOCUMENTS

| 3,209,718 A | 10/1965 | Rather et al. |
| 4,075,967 A | 2/1978 | Silvey |
| 4,398,487 A | 8/1983 | Ortloff et al. |

(Continued)

FOREIGN PATENT DOCUMENTS

| EP | 0096956 | 12/1983 |
| WO | WO-2014166543 | 10/2014 |
| WO | WO-2016080828 | 5/2016 |

OTHER PUBLICATIONS

Allen, et al., "Comparisons of Various Fairing Geometries for Vortex Suppression at High Reynolds Numbers", OTC 19377, 2008 Offshore Technology Conference, Houston, Texas, (May 5-8, 2008), 16 pages.

*Primary Examiner* — Frederick L Lagman
(74) *Attorney, Agent, or Firm* — Blakely Sokoloff Taylor & Zafman LLP

(57) ABSTRACT

A vortex-induced vibration (VIV) suppression device including a fairing comprising a fairing body having a nose dimensioned to partially encircle an underlying tubular and a first arm and a second arm extending from the nose, wherein the nose, the first arm and the second arm are one integrally formed unit and the first arm and the second arm are spaced a distance from one another along their entire length so as to define a gap therebetween; and a securing element dimensioned to fit within the gap between the first arm and the second arm and secure the fairing to an underlying tubular. Methods for securing a U-shaped fairing to a tubular and manufacturing a U-shaped fairing are also disclosed.

14 Claims, 7 Drawing Sheets

(51) Int. Cl.
*B21D 22/02* (2006.01)
*B63B 21/50* (2006.01)

(56) References Cited

U.S. PATENT DOCUMENTS

| | | | | |
|---|---|---|---|---|
| 4,474,129 | A | * | 10/1984 | Watkins ................ B63B 21/663 114/243 |
| 5,456,199 | A | * | 10/1995 | Kernkamp ............... B63B 1/32 114/111 |
| 5,738,034 | A | | 4/1998 | Wolff et al. |
| 5,984,584 | A | * | 11/1999 | McMillan ................ E21B 17/01 114/243 |
| 6,010,278 | A | * | 1/2000 | Denison ................ B63B 21/502 114/243 |
| 6,067,922 | A | | 5/2000 | Denison et al. |
| 6,517,289 | B1 | | 2/2003 | Coakley et al. |
| 7,070,361 | B2 | | 7/2006 | McMillan et al. |
| 7,337,742 | B1 | | 3/2008 | Masters et al. |
| 7,513,209 | B2 | | 4/2009 | Masters et al. |
| 8,834,070 | B2 | * | 9/2014 | Masters ................ B63B 21/663 114/243 |
| 2002/0134553 | A1 | | 9/2002 | Woodrow |
| 2005/0254903 | A1 | * | 11/2005 | McMillan ................ F16L 1/20 405/216 |
| 2006/0021560 | A1 | * | 2/2006 | McMillan ................ E21B 17/01 114/221 R |
| 2007/0104542 | A1 | * | 5/2007 | Somerville ........... B63B 21/663 405/224.1 |
| 2007/0215028 | A1 | | 9/2007 | Lie |
| 2012/0168019 | A1 | * | 7/2012 | Allen ........................ F16L 1/15 138/103 |
| 2012/0243944 | A1 | * | 9/2012 | Masters ................ B63B 21/663 405/216 |

\* cited by examiner

TWO-PIECE U-SHAPED FAIRING

CROSS-REFERENCE TO RELATED APPLICATION

The application is a non-provisional application of U.S. Provisional Patent Application No. 62/183,299, filed Jun. 23, 2015 and U.S. Provisional Patent Application No. 62/295,482, filed Feb. 15, 2016, both of which are incorporated herein by reference

FIELD

A two-piece U-shaped fairing. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression.

Fairings are a popular VIV suppression device. Fairings are placed around a tubular (on a collar that clamps to the tubular to restrain the fairing from sliding along the tubular's longitudinal axis more than desired) and are free to rotate (weathervane) with changes in current direction.

In order to function properly, it is important that the fairings be structurally sound and do not come off of the underlying tubular. It is also important that the fairing be economical and easy to fabricate. Another desired feature is that the fairing be able to accommodate copper or other materials to inhibit marine growth in the annulus so that the fairing is not restricted from rotation by marine growth.

SUMMARY

The present invention provides systems and methods for securing a U-shaped fairing to a tubular. The U-shaped fairing disclosed herein is structurally sound and capable of being securing fastened to an underlying tubular. The fairing is also designed to accommodate antifouling materials in the annulus and restrict marine growth in the annulus. The entire fairing, including an associate securing element, may be molded as one single piece such that manufacturing and processing times are sufficiently reduced.

More specifically, in one embodiment, the invention is directed to a vortex-induced vibration (VIV) suppression device including a fairing having a fairing body having a nose dimensioned to partially encircle an underlying tubular and a first arm and a second arm extending from the nose, wherein the nose, the first arm and the second arm are one integrally formed unit and the first arm and the second arm are spaced a distance from one another along their entire length so as to define a gap therebetween. A securing element dimensioned to fit within the gap between the first arm and the second arm and secure the fairing to an underlying tubular is further provided. The securing element may also be formed as one integrally formed unit such that the entire fairing device consists of only two pieces, namely the fairing body and the securing element. The gap maybe of a size sufficient for insertion of a tubular therethrough. The first arm and the second arm may be substantially parallel to one another. The first arm and the second arm may each include a first portion extending in a same direction away from the nose, and a second portion extending toward one another. An opening may be formed between interfacing ends formed by the second portion of the first arm and the second arm. The securing element may include a base member, a first extension member extending from one side of the base member and a second extension member extending from another side of the base member, and the base member the first extension member and the second extension member may be one integrally formed unit. The first extension member and the second extension member may be spaced a distance from one another such that their outer surfaces rest along an inner surface of the first arm and the second arm of the fairing body, respectively, and the base member rests along a tubular when the fairing body is positioned around a tubular. A space formed between the first extension member and the second extension member may be substantially open to allow for fluid flow entirely through the extension member. The device may further include an internal support member positioned between the first extension member and the second extension member, wherein the internal support member is positioned between the first extension member and the second extension member and extends along less than an entire height of the first and second extension members. The securing element may extend along less than an entire length of the fairing body. The nose may include a longitudinal opening extending along at least a portion of an axis of the fairing body, and wherein the opening is modifiable between an open configuration and a closed configuration. The device may further include an antifouling member placed along a portion of the securing element.

In another embodiment, a vortex-induced vibration (VIV) suppression device includes a fairing comprising a fairing body having a nose dimensioned to partially encircle an underlying tubular and a first arm and a second arm extending from the nose, wherein the first arm and the second arm are spaced a distance from one another along their entire length so as to define a gap therebetween, a securing element dimensioned to fit within the gap between the first arm and the second arm and secure the fairing to an underlying tubular, wherein the securing element is substantially open to allow for fluid flow through the entire securing element, and an antifouling member attached to the securing element. The nose, the first arm and the second arm may be a U-shaped integrally formed unit and the securing element is one integrally formed unit. The securing element may include at least three open sides and fluid flow is in a direction substantially parallel to at least a length dimension of the securing element. The antifouling member may be a copper piece extending along an entire length of the securing element. The antifouling member may be positioned along a surface of the securing element that interfaces with a tubular around which the fairing body and securing element are positioned.

In another embodiment, a method of manufacturing a VIV suppression device includes molding a U-shaped fairing body and a securing element as a single unit using a rotational molding technique. The method may further include after molding, separating the U-shaped fairing body from the securing element to form a U-shaped fairing body and a securing element dimensioned for insertion within the U-shaped fairing body. The method may further include during molding, molding a transition member between the U-shaped fairing body and the securing element, wherein the transition member causes the securing element to have a smaller width than the U-shaped fairing body.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
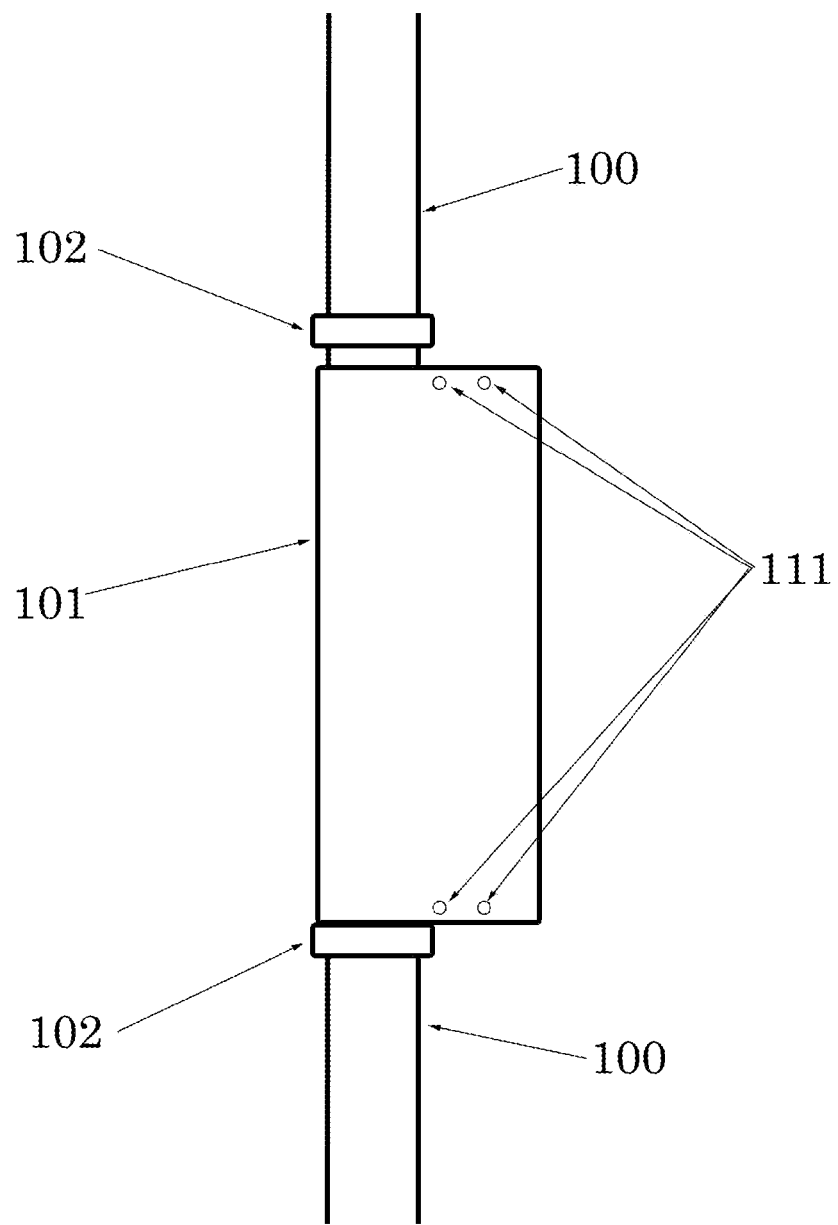
FIG. 1A is a side view of a pipe with a U-shaped fairing.

FIG. 1A illustrates a side view of one embodiment of a VIV suppression device attached to an underlying structure. Referring now to the invention in more detail, FIG. 1A shows a VIV suppression device, in this case a fairing 101, secured around an underlying structure, in this case a tubular 100. Fasteners 111 are used to connect a securing element to fairing 101. Collars 102 are clamped tight to tubular 100 and restrict sliding of fairing 101.

Again referring to FIG. 1A, fairing 101 is free to rotate around tubular 100 while collars 102 are clamped tight against tubular 100. Fasteners 111 are used to attach the fairings to an internal securing element.

Still referring to FIG. 1A, fairing 101 may be of any suitable size or shape. In this embodiment, fairing 101 is shown having a cross sectional shaped like the letter "U" or a similar shape.

Figure 1B:
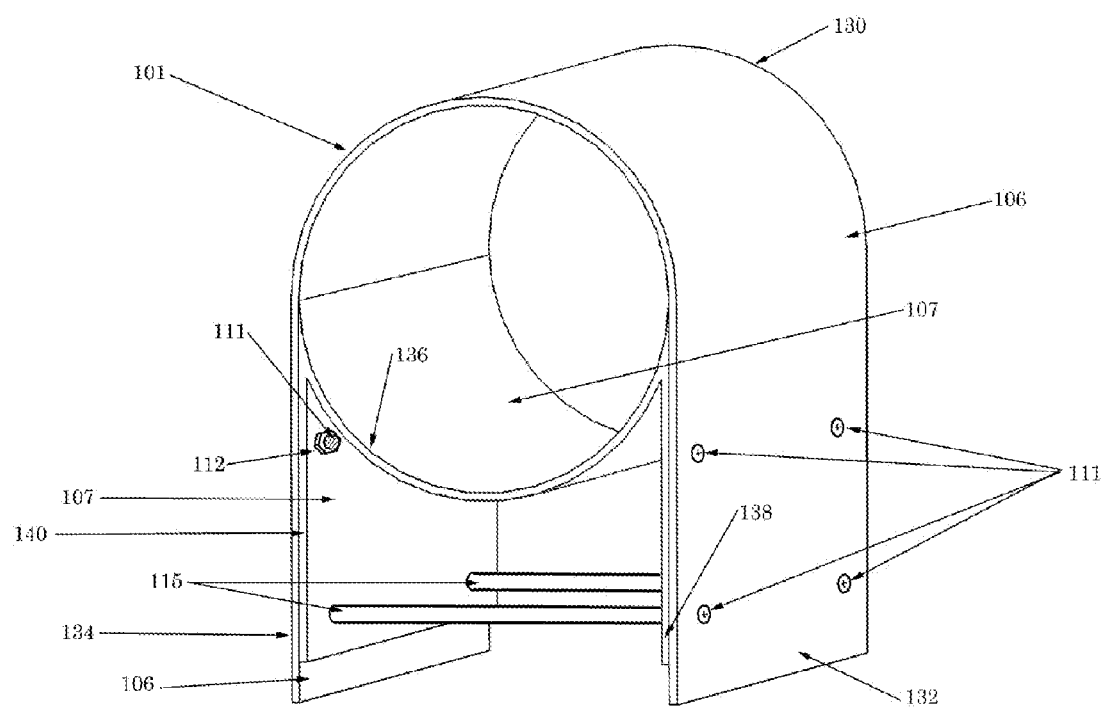
FIG. 1B is a perspective view of a U-shaped fairing with a unique securing element.

Referring now to FIG. 1B, FIG. 1B illustrates a side perspective view of the fairing shown in FIG. 1A. From this view, it can be seen that fairing 101 includes fairing body 106 and securing element 107 which are connected by bolts 111 and nuts 112. Optional internal supports 115 are also shown.

Again referring to FIG. 1B, fairing body 106 will typically be shaped like the letter "U" as shown, but may also have other similar shapes. More specifically, fairing body 106 may include a nose portion 130, which is for example, a semi circular or curved portion of the body, that partially encircles the underlying tubular, and arm members 132, 134 extending from nose portion 130. In the illustrated embodiment, arm members 132, 134 are substantially straight members that are parallel to each other. In other embodiments, however, arm members 132, 134 may taper toward one another such that a distance or gap between arm member 132 and arm member 134 at the nose portion 130 is smaller than a distance or gap between the free ends of arm member 132 and arm member 134. The structure of fairing body 106 including nose portion 130 and arm members 132, 134 can be seen in more detail from FIG. 1C.

Securing element 107 is dimensioned to be inserted between arm members 132, 134 of fairing body 106. Securing element 107 includes a base member 136 and extension members 138, 140 which extend from base member 136 as will be described in more detail in reference to FIG. 1D. In this aspect, when securing element 107 is inserted within fairing body 106, base member 136 forms a closed structure with nose portion 130 of fairing body 106 that completely surrounds tubular 100. In addition, extension members 138, 140 may be parallel to one another such that they can be positioned along the inner surfaces of arm members 132, 134 of fairing body 106 and connected to arm members 132, 134 as shown. It should further be understood that although in this embodiment, securing element 107 is shown having a curved or semicircular base member 136 near the underlying tubular (not shown), base member 136 may have other shapes (straight, for example). Securing element 107 may act as a bearing surface for fairing 101 and also serve to strengthen fairing body 106. In addition, while FIG. 1B shows bolts 111 and nuts 112 used to attach securing element 107 to fairing body 106, other attachment methods may be used including, but not limited to, chemical bonding, riveting, welding, clamping, or any combination thereof. Still further, internal supports 115 are optional, and when included may be used to, for example, further strengthen fairing 101 and fairing body 106. While internal supports 115 are shown as rods such that they do not extend along an entire length or width of arm members 132, 134 of fairing body 106 in FIG. 1A, other internal support structures may be used including, but not limited to, blocks, trusses, beams, and any combination thereof.

Still referring to FIG. 1B, securing element 107 will typically traverse from one end of the fairing to another along the underlying tubular's longitudinal axis, but may traverse only part of the fairing or may consist of sections that do, or do not, traverse the entire fairing. Securing element 107 may be a single integrally formed structure, or include more than one piece. While the possibility of securing element 107 including various sections along the fairing was previously presented, it is also possible for the various sides of securing element 107 to include more than one structure that is bonded, fastened, welded, or held together by any suitable means. It is also possible for various parts of securing element 107 to include different materials or more than one material. Similarly, securing element 107 may include a different material than fairing body 106.

Still referring to FIG. 1B, securing element 107, fairing body 106, bolts 111, nuts 112, and internal supports 115 may be made of any suitable material including, but not limited to, plastic, metal, composite, fiberglass, and rubber or elastomer. Each of securing element 107, fairing 106, bolts 111, nuts 112, and internal supports 115 may be made of the same material or made of different materials and materials may be mixed or matched in any suitable manner.

Figure 1C:
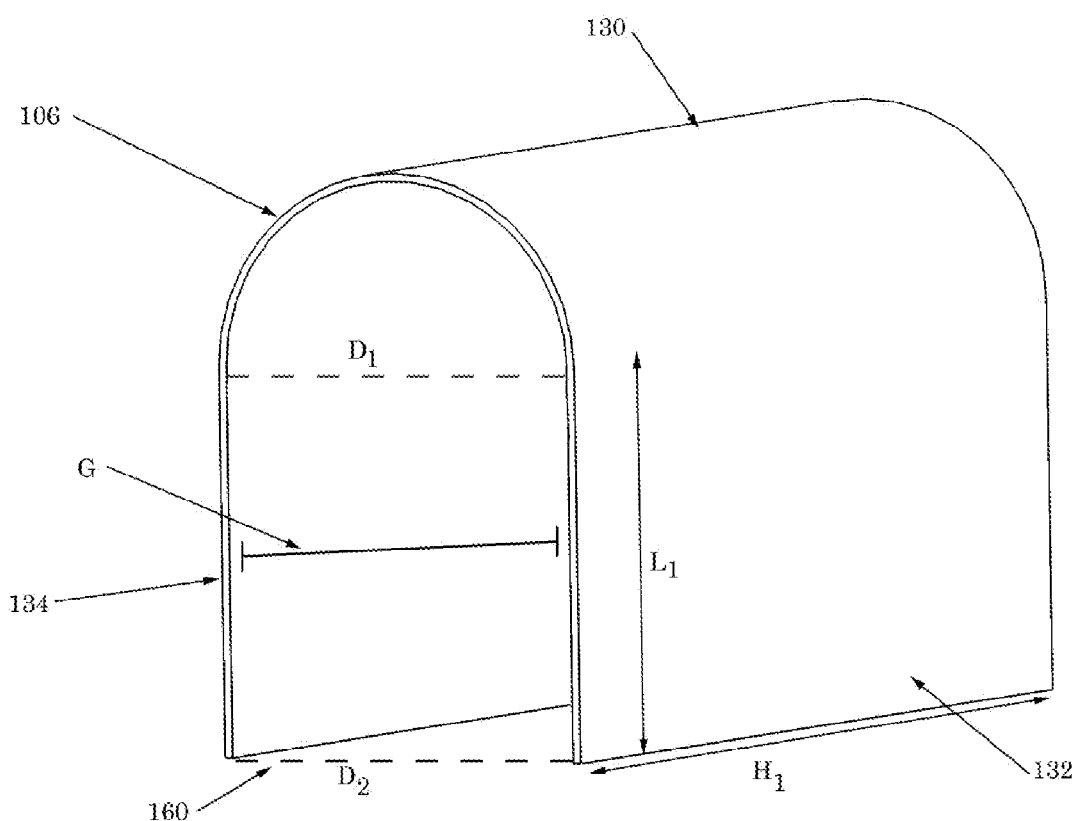
FIG. 1C is a perspective view of a U-shaped fairing body.

Referring now to FIG. 1C, FIG. 1C illustrates a perspective view of the body portion of the fairing of FIG. 1A-FIG. 1B. From this view, it can be seen that the arm members 132, 134 extending from nose portion 130 form a gap G and an opening 160 through which the underlying tubular can be inserted. In one embodiment, arm members 132, 134 are substantially parallel with one another such that the distance $D_1$ formed between portions of arm members 132, 134 near the nose portion is substantially the same as the distance $D_2$ between the free ends of arm members 132, 134. In other words, in this embodiment, $D_1$ is equal to $D_2$. Said another way, $D_1$ is substantially equal to $D_2$ along an entire length dimension ($L_1$) and width dimension ($D_1$) of fairing body 106. It is contemplated, however, that in other embodiments $D_1$ and $D_2$ may be different. For example, $D_1$ may be greater than $D_2$, or $D_1$ may be less than $D_2$.

Fairing body 106, including nose portion 130 and arm members 132, 134 may, in one embodiment, be a single integrally formed piece or structure. For example, nose portion 130 and arm members 132, 134 may be formed by bending a single sheet of material, or molding a single piece of material, into the desired shape and size (e.g., a fairing having a nose portion 130 and parallel arm members 132, 134). In other embodiments, fairing body 106 may be made of multiple pieces or in multiple sections. In the case of multiple pieces, the pieces (e.g., nose portion 130 and parallel arm members 132, 134) may be attached to each other by any suitable means. Each piece may be made of the same material or of different materials consisting of, but not limited to, one or more of metal, plastic, rubber, elastomer, fiberglass, or composite.

Figure 1D:
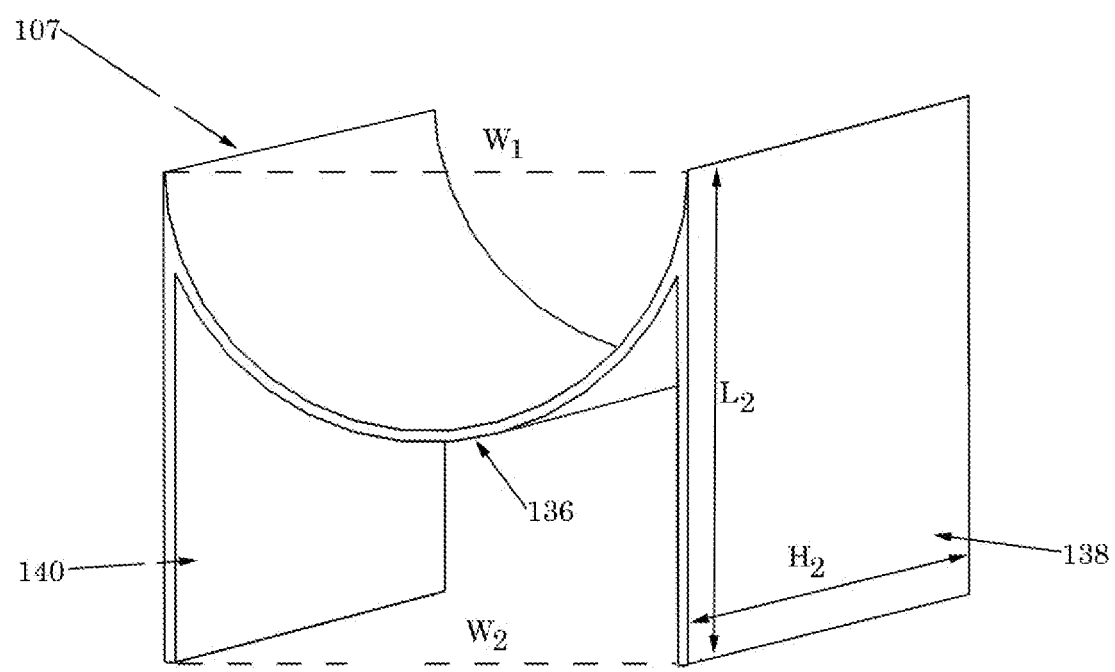
FIG. 1D is a perspective view of a securing element for a U-shaped fairing.

Referring now to FIG. 1D, FIG. 1D illustrates an end perspective view of the securing element of the fairing described in reference to FIG. 1A-FIG. 1B, except that the internal supports are omitted. From this view, it can be seen that securing element 107 includes base member 136, which in this embodiment is a semicircular shaped structure, and extension members 138, 140 extending from base member 136. Base member 136 is curved such that it protrudes into the gap formed between extension members 138, 140. In other words, base member 136 forms a concave shaped cavity between extension members 138, 140. The cavity is dimensioned to receive one side of the underlying tubular such that when the nose portion 130 of body portion 106 is positioned around the other side of the underlying tubular, the base member 136 and nose portion 130 completely encircle the tubular. Extension members 138, 140 may, in one embodiment, be parallel to one another such that a width $W_1$ of the gap formed between extension members 138, 140 near base member 136 is substantially the same as a width $W_2$ of the gap formed between the free ends of extension members 138, 140. In other embodiments, $W_1$ and $W_2$ of the gap may be different. For example, where the arm members 132, 134 of body portion 106 are tapered toward one another such that $D_2$ is less than $D_1$, extension members 138, 140 may also taper toward one another such that $W_2$ is less than $W_1$. In addition, it should be understood that in some embodiments, a length dimension ($L_2$) of extension members 138, 140 of securing element 107 may be substantially similar to the length dimension ($L_1$) of arm members 132, 134 of fairing body 106 and a height dimension ($H_2$) of extension members 138, 140 may be substantially similar to the height dimension ($H_1$) of arm members 132, 134 of fairing body 106. In addition, the opening, gap or channel formed between base member 136, extension members 138, 140 may be substantially open such that fluid may flow through it. For example, as shown in FIG. 1D, at least three sides of securing element 107 are open such that fluid may flow in one side and out another opposing side, for example, in a direction parallel to a height dimension ($H_2$) of securing element 107.

Securing element 107 may be made of a single integrally formed piece, for example, such as by bending a single sheet of material, or molding a single piece of material into the desired shape and size. Alternatively, securing element may be made of multiple pieces or in multiple sections. The pieces may be attached to each other by any suitable means. Each piece may be made of the same material or of different materials consisting of, but not limited to, one or more of metal, plastic, rubber, elastomer, fiberglass, or composite.

Figure 2:
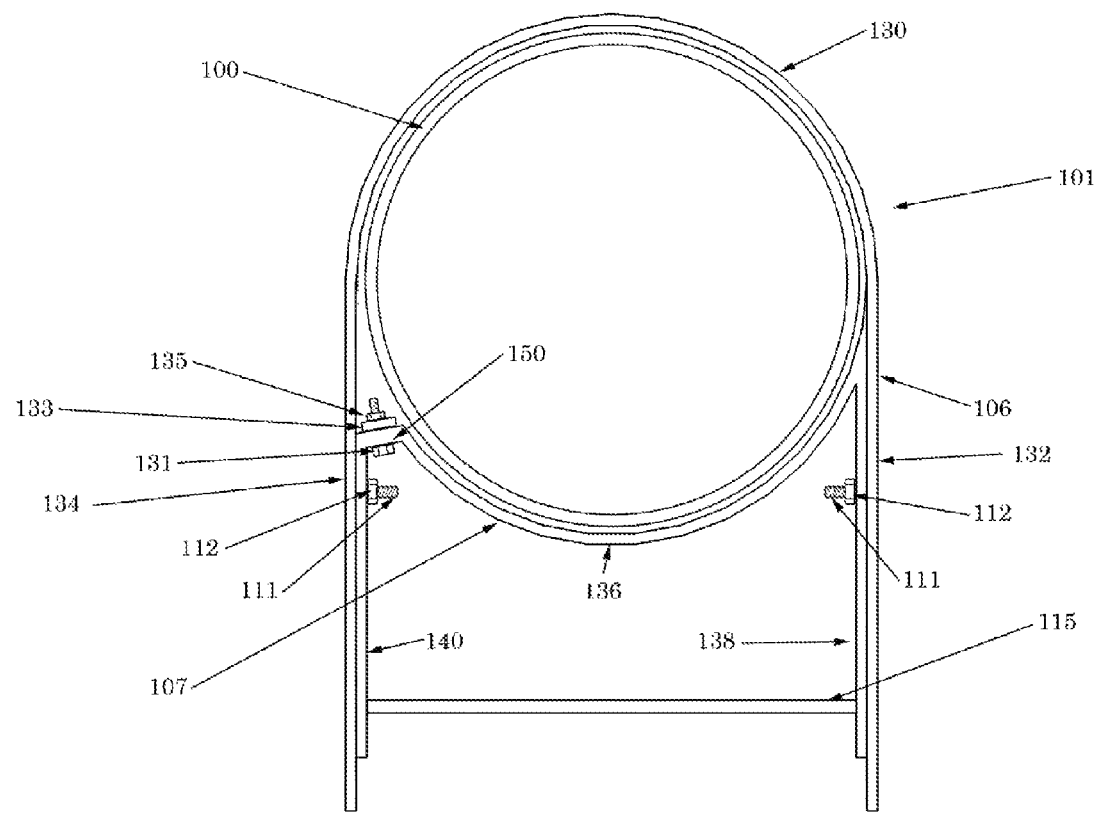
FIG. 2 is an end view of a U-shaped fairing with an accommodation for a copper piece.

It should be understood that in some embodiments, fairing body portion 106 and securing element 107 are manufactured separately from different pieces of material. In other embodiments, fairing body portion 106 and securing element 107 are formed as a single structure, for example by rotational molding a material into the desired size and shape structure, and the structure once taken out of the mold is then cut into sections in the shape of the body portion 106 and securing element 107. This exemplary method of manufacturing a fairing will be discussed in more detail in reference to FIG. 4. Referring now to FIG. 2, FIG. 2 illustrates an end view of a fairing similar to that discussed in reference to FIG. 1A-FIG. 1C, except in this embodiment, the fairing includes an antifouling member. Representatively, similar to FIG. 1A-FIG. 1C, fairing 101 includes fairing body 106 having a nose portion 130 and arm members 132, 134. In addition, securing element 107 includes a base member 136 and extension members 138, 140. Once assembled together, nose portion 130 of fairing 101 encircles one side of tubular 100, while base member 136 of securing element 107, which is positioned within fairing body 106, encircles the other side of tubular 100. In addition, extension members 138, 140 of securing element 107 are secured by bolts 111 and nuts 112 to arm members 132, 134 of fairing body 106. Still further, internal supports 115 may be attached at each end to both sides of fairing 101 (e.g., arm members 132, 134) and copper piece 133 may be attached to securing element 107 by bolt 131 and nut 135.

In the embodiment shown in FIG. 2, however, securing element 107 includes an antifouling region 150 near tubular 100 to accommodate an antifouling system including, for example, copper piece 133, bolt 131, and nut 135. In addition, other parts of securing element 107 may be altered to accommodate one or more copper or other antifouling pieces. A key feature of securing element 107 in FIG. 2 is that securing element 107 together with fairing body 106 completely surround tubular 100 which reduces the flow of water in the annulus area immediately surrounding tubular 100 and also restricts the availability of light in this same annulus area (which reduces marine growth in the annulus). It is recognized that any number of copper piece 133, bolt 131, and nut 135 may be used and that more than one bolt 131 and nut 135 may be used for a single copper piece 133. Copper piece 133 may be of any suitable shape and may be split into sections and will typically be a bar or plate. Copper piece 133 may traverse the entire longitudinal length of fairing 101 or may traverse part of the longitudinal length of fairing 101. Copper piece 133 may be attached by any suitable means.

Still referring to FIG. 2, fairing body 106 and securing element 107 may also be attached or mated by other means. For example, fairing body 106 may have an open (female) channel running down its side walls on both sides to receive securing element 107. Securing element 107 may, or may not, have male pieces to mate with the open channel. Pins, cable ties, screws, bolts, nuts, rivets, or any other suitable means may be used to assist with mating securing element 107 with fairing body 106 through using the channel (or shorter channel sections).

Still referring to FIG. 2, securing element 107, bolts 111, nuts 112, bolt 131, and nut 135 may be made of any suitable material including, but not limited to, metal, plastic, rubber, elastomer, fiberglass, composite, or synthetic. Copper piece 133 is typically made of a copper or copper alloy material but other materials that have antifouling properties may also be used. Copper piece 133 may cover all or part of securing element 107 or fairing body 106 and thus need not be a single piece as depicted in FIG. 2. Copper piece 133 may be present on the inside surface of the base member 136 of securing element 107 (facing tubular 100) or may be on the exterior of securing element 107, or both.

Figure 3:
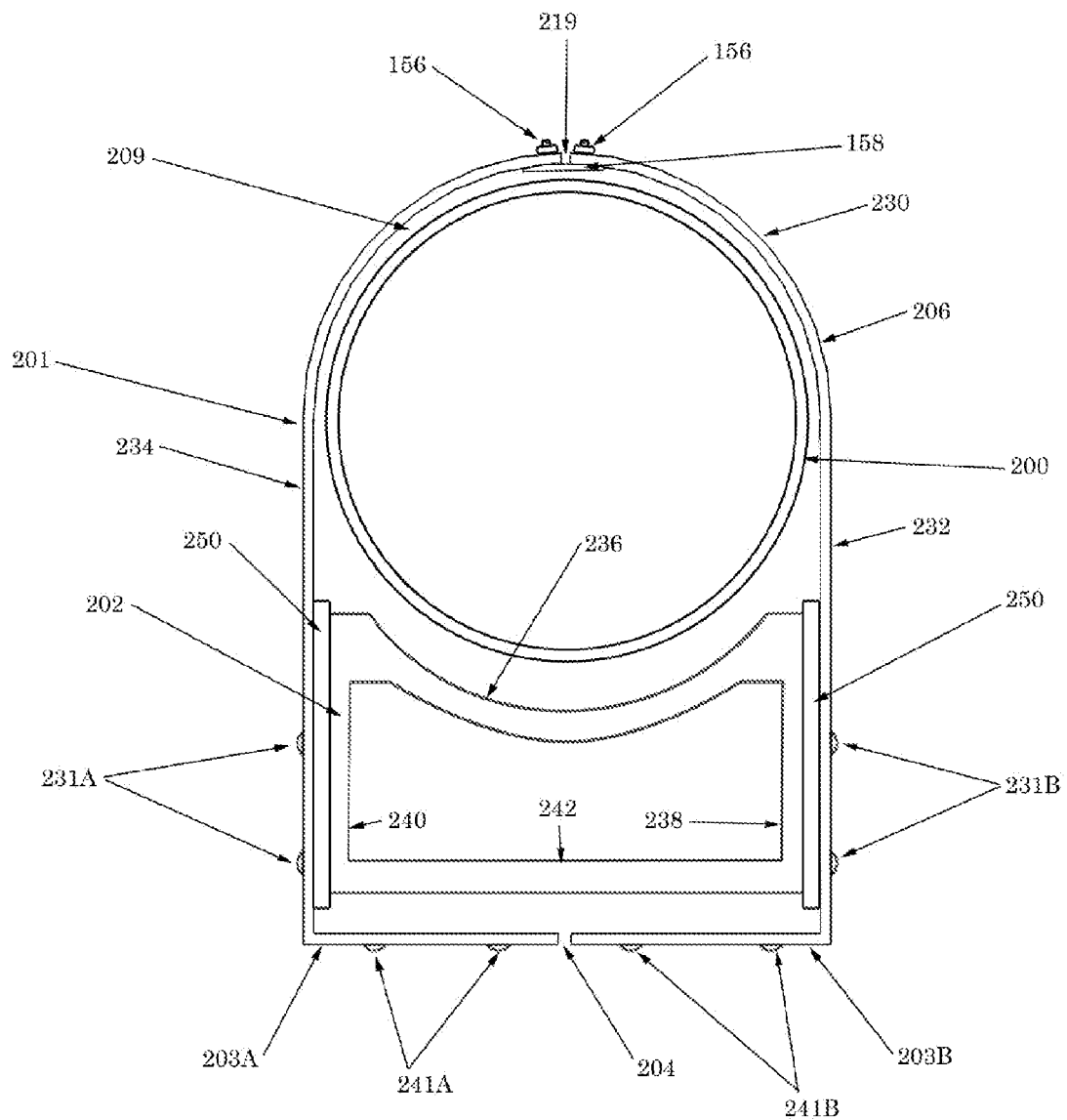
FIG. 3 is a top view of a U-shaped fairing using a fastener type latching mechanism.

Referring now to FIG. 3, FIG. 3 illustrates an end view of another embodiment of a U-shaped fairing. U-shaped fairing 201 is shown installed around tubular 200 with annulus 209 representing the gap between U-shaped fairing 201 and tubular 200. Similar to the previously discussed fairing, the fairing body 206 includes a nose portion 230 and arm members 232, 234 extending from nose portion 230. In addition, rear fairing sides 203A and 203B extend inwardly toward one another from the ends of arm members 232, 234. Each of the nose portion 230, arm members 232, 234 and rear fairing sides 203A, 203B may be formed as one single integrally formed structure. The rear fairing sides 203A, 203B may be separated by rear opening 204.

Securing element 202 is similar to the previously discussed securing element 107 in that it is inserted between arm members 232, 234 once the fairing body 206 is placed around the tubular. Securing element 202 may further include a base member 236 that partially encircles the tubular and extension members 238, 240 extending from base member 236. In some embodiments, extension members 238, 240 may also be connected by an optional connecting member 242, which is at an end of the extension members 238, 240 opposite the base member 236. In addition, securing element 202 may be attached to the arm members 232, 234 of fairing 201 by left side fasteners 231A and right side fasteners 231B.

In addition, left rear fasteners 241A, and right rear fasteners 241B may be used to attach rear fairing sides 203A, 203B to the fairing 201. Optional side supports 250 are shown between securing element 202 and fairing 201 and may be attached using left side fasteners 231A or right side fasteners 231B or other fasteners that do not travel into securing element 202.

In this embodiment, U-shaped fairing 201 may also include a nose opening 219 that can be used to position fairing 201 around the underlying tubular. In particular, opening 219 may be modifiable between an open and closed configuration such that it can be opened and the tubular inserted through the opening 219, and then closed around the tubular. To hold the opening 219 in the closed configuration, opening 219 may be bridged by internal support 158 which is connected to U-shaped fairing 201 by nose fasteners 156.

Again referring to FIG. 3, U-shaped fairing 201 is pulled apart at nose opening 219 and placed around tubular 200 during installation. One or more left side fasteners 231A, right side fasteners 231B, left rear fasteners 241A, and right rear fasteners 241B may be removed (or not yet installed) to reduce stresses on U-shaped fairing 201 while it is pulled open during installation. For example, one or more left side fasteners 231A (in addition to the left side of nose fasteners 156) may be absent and installed after U-shaped fairing 201 is placed around tubular 200. In order to minimize stresses during installation, it is generally desirable to have an unfastened length that is as long as necessary along one side (beginning at the nose and going towards the tail). Thus, securing element 202 may be designed to be sufficiently far from tubular 200 to achieve a sufficiently long unfastened length while minimizing the number of fasteners that must be installed during installation. It is possible that left rear fasteners 241A, and right rear fasteners 241B may not be required. It is also possible to replace rear opening 204 with a hinge. Rear opening 204 (or a hinge in its place) may run the entire height of fairing 201 or may exist only in short segments. Optional side supports 250 are used to add structural stiffness to the walls of fairing 201 and may exist at any location along fairing 201 and may consist of short segments along the fairing height or may consist of one or more long segments that traverses most of the fairing height. Optional side supports 250 may be of any suitable geometry.

Still referring to FIG. 3, securing element 202 may have any suitable geometry provided that it attaches to both left and right hand sides of U-shaped fairing 201. It is often desirable, but not always necessary, that securing element 202 provide some bearing or structural support for U-shaped fairing 201 when current or wave forces create contact or impact between U-shaped fairing 201 and securing element 202. Securing element 202 will typically be short relative to the fairing height (the fairing height is normal to the page in FIG. 3) and thus two or more securing elements 202 may be used along the fairing height and spaced apart. U-shaped fairing 201 may vary in shape such as having a larger annulus at the nose, having appurtenances at the nose, having sides that taper inward or outward, having the rear fairing sides 203A and 203B removed or absent, etc. Annulus 209 may be larger on the sides than from the nose towards the block or vice versa or may vary non-uniformly or in any way. Other appurtenances may be attached to U-shaped fairing 201. Any number, size, or type of fasteners may be used for nose fasteners 156, left side fasteners 231A, right side fasteners 231B, left rear fasteners 241A, and right rear fasteners 241B.

Internal support 158 may be of any suitable size or shape and may be as tall as the fairing height or may be made in discrete segments that can vary from one other in size and shape. Internal support 158 and securing element 202 may be attached to U-shaped fairing 201 by any suitable means including, but not limited to, bolting, chemical bonding, molding into the part, clamping, riveting, and clipping. Often, if fasteners are used, one or more of nose fasteners 156, left side fasteners 231A, right side fasteners 231B, left rear fasteners 241A, and right rear fasteners 241B will be countersunk. Corresponding nuts may be countersunk too.

Still referring to FIG. 3, U-shaped fairing 201, rear fairing sides 203A and 203B (which may be separate structures from U-shaped fairing 201 or integral to U-shaped fairing 201), securing element 202, optional side supports 250, left side fasteners 231A, right side fasteners 231B, left rear fasteners 241A, right rear fasteners 241B, internal support 158, and nose fasteners 156 may be made of any suitable material including, but not limited to, metal, plastic, rubber or other elastomer, ceramic, fiberglass, synthetic, and wood. Materials may be mixed and matched as needed, and various components may each be made of the same material or may be made of different materials.

Figure 4:
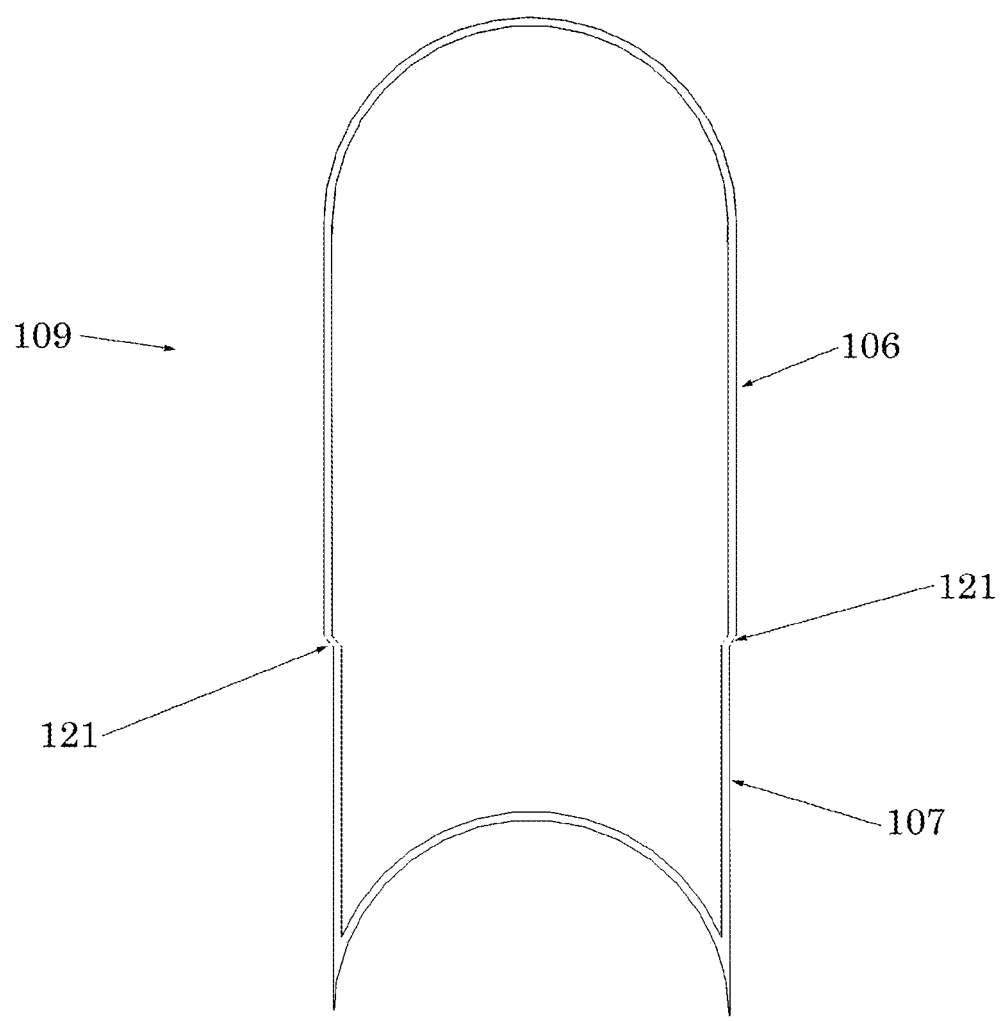
FIG. 4 is an end view of a single piece that contains both the U-shaped fairing body and the securing element for the U-shaped fairing.

Referring now to FIG. 4, FIG. 4 shows one embodiment of a method of manufacturing a U-shaped fairing. Representatively, FIG. 4 shows a side view of a molded body 109 which includes a fairing body and securing element, for example fairing body 106 and securing element 107 as previously discussed in reference to FIG. 1A-FIG. 2, and transition pieces 121. It should be noted that although reference is made to fairing body 106 and securing element 107 of fairing 101 from FIG. 1A-FIG. 2, the method of manufacturing could also be used to manufacture one or more aspects of fairing 201 discussed in reference to FIG. 3.

Again referring to FIG. 4, fairing body 106 and securing element 107 are molded together as a single unit called molded body 109, for example using a rotational molding technique. For example, the molding steps may include filling a hollow mold (which is in the shape of the U-shaped fairing and securing element) with a desired material, heating the mold, rotating the mold so that the material disperses and sticks to the walls of the mold, and then cooling the mold so the material solidifies into the desired shape. Transition pieces 121 connect fairing body 106 and securing element 107 and are typically cut away after molding. Once transition pieces 121 are cut away, fairing body 106 and securing element 107 are separate and may be utilized as designated in other parts of this invention. By producing molded body 109, both fairing body 106 and securing element 107 may be molded at the same time thereby saving time and costs. In addition, the resulting VIV suppression device may be considered to include only two pieces, namely the fairing body 106 and securing element 107, making it an improvement over conventional devices in which the body and/or securing element are made of multiple pieces, therefore more than two pieces. It is noted that other geometries of securing element 107 and fairing body 106 may also be molded together as a single unit. For example, the curved portion of securing element 107 may be turned 180 degrees from what is shown in FIG. 4, and cut away separately from the straight side walls of securing element 107 (this may be easier to mold in some instances). In that case, the curved and straight segments of securing element 107 would be attached separately to each other or to fairing body 106 by any suitable means. Note that the straight segments of securing element 107 are optional and may not be needed if the side walls of fairing body 106 are sufficiently strong without them. Hinges may also be used to ensure ease of opening fairing body 106 around an underlying tubular.

Still referring to FIG. 4, fairing body 106, securing element 107, and transition pieces 121 may be of any suitable size or shape, but a prevalent feature of this invention is that securing element 107 is constructed to be near the underlying tubular and, together with fairing body 106, completely cover most all of the underlying tubular (i.e., completely surround the underlying tubular and traverse the length of the fairing). In addition, securing element 107 serves to strengthen fairing body 106 by aligning and attaching parallel sides. Fairing body 106, securing element 107, and transition pieces 121 may be made of any suitable material including, but not limited to, metal, plastic, rubber, elastomer, fiberglass, or composite.

Still referring to FIG. 4, molded body 109 may be made by any suitable plastic forming means including rotational molding, injection molding, drape forming, and extrusion.

The above aspects of this invention may be mixed and matched in any manner suitable to achieve the purposes of this invention. It is recognized that, various components may be mixed and matched and that antifouling materials or coatings may be attached to all or part of the components.

In broad embodiment, the present invention consists of methods for securing a U-shaped fairing to a tubular.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

What is claimed is:

1. A vortex-induced vibration (VIV) suppression device comprising:
    a fairing comprising a fairing body having a nose dimensioned to partially encircle an underlying tubular and a first arm and a second arm extending from the nose, wherein the first arm and the second arm are spaced a distance from one another along their entire length so as to define a gap therebetween;
    a securing element dimensioned to fit within the gap between the first arm and the second arm and secure the fairing to an underlying tubular, the securing element having a base member, a first extension member extending from one side of the base member and a second extension member extending from another side of the base member, the base member the first extension member and the second extension member are one integrally formed unit; and
    an internal support member positioned between the first extension member and the second extension member of the securing element, wherein the internal support member extends along less than an entire length of the first and second extension members.

2. The VIV suppression device of claim 1 wherein the gap is of a size sufficient for insertion of a tubular therethrough.

3. The VIV suppression device of claim 1 wherein the nose, the first arm and the second arm are one integrally formed unit, and the first arm and the second arm are substantially parallel to one another.

4. The VIV suppression device of claim 1 wherein the first arm and the second arm each comprise a first portion extending in a same direction away from the nose and a second portion extending toward one another.

5. The VIV suppression device of claim 4 wherein an opening is formed between interfacing ends formed by the second portion of the first arm and the second portion of the second arm.

6. The VIV suppression device of claim 1 wherein the first extension member and the second extension member are spaced a distance from one another such that their outer surfaces rest along an inner surface of the first arm and the second arm of the fairing body, respectively, and the base member rests along a tubular when the fairing body is positioned around a tubular.

7. The VIV suppression device of claim 1 wherein a space formed between the first extension member and the second extension member is substantially open to allow for fluid flow entirely through the extension member.

8. The VIV suppression device of claim 1 wherein the securing element extends along an entire height of the fairing body.

9. The VIV suppression device of claim 1 wherein the nose comprises a longitudinal opening extending along at least a portion of an axis of the fairing body, and wherein the opening is modifiable between an open configuration and a closed configuration.

10. The VIV suppression device of claim 1 further comprising an antifouling member placed along a portion of the securing element.

11. A vortex-induced vibration (VIV) suppression device comprising:
   a fairing comprising a fairing body having a nose dimensioned to partially encircle an underlying tubular and a first arm and a second arm extending from the nose, wherein the first arm and the second arm are spaced a distance from one another along their entire length so as to define a gap therebetween;
   a securing element dimensioned to fit within the gap between the first arm and the second arm and secure the fairing to an underlying tubular, wherein the securing element comprises at least three open sides to allow for fluid flow through the entire securing element, and in a direction substantially parallel to at least a length dimension of the securing element; and
   an antifouling member attached to the securing element.

12. The VIV suppression device of claim 11 wherein the nose, the first arm and the second arm are a U-shaped integrally formed unit and the securing element is one integrally formed unit such that the device consists of only two pieces.

13. The VIV suppression device of claim 11 wherein the antifouling member is a copper piece extending along an entire length of the securing element.

14. The VIV suppression device of claim 11 wherein the antifouling member is positioned along a surface of the securing element that interfaces with a tubular around which the fairing body and securing element are positioned.

* * * * *